2,308,063

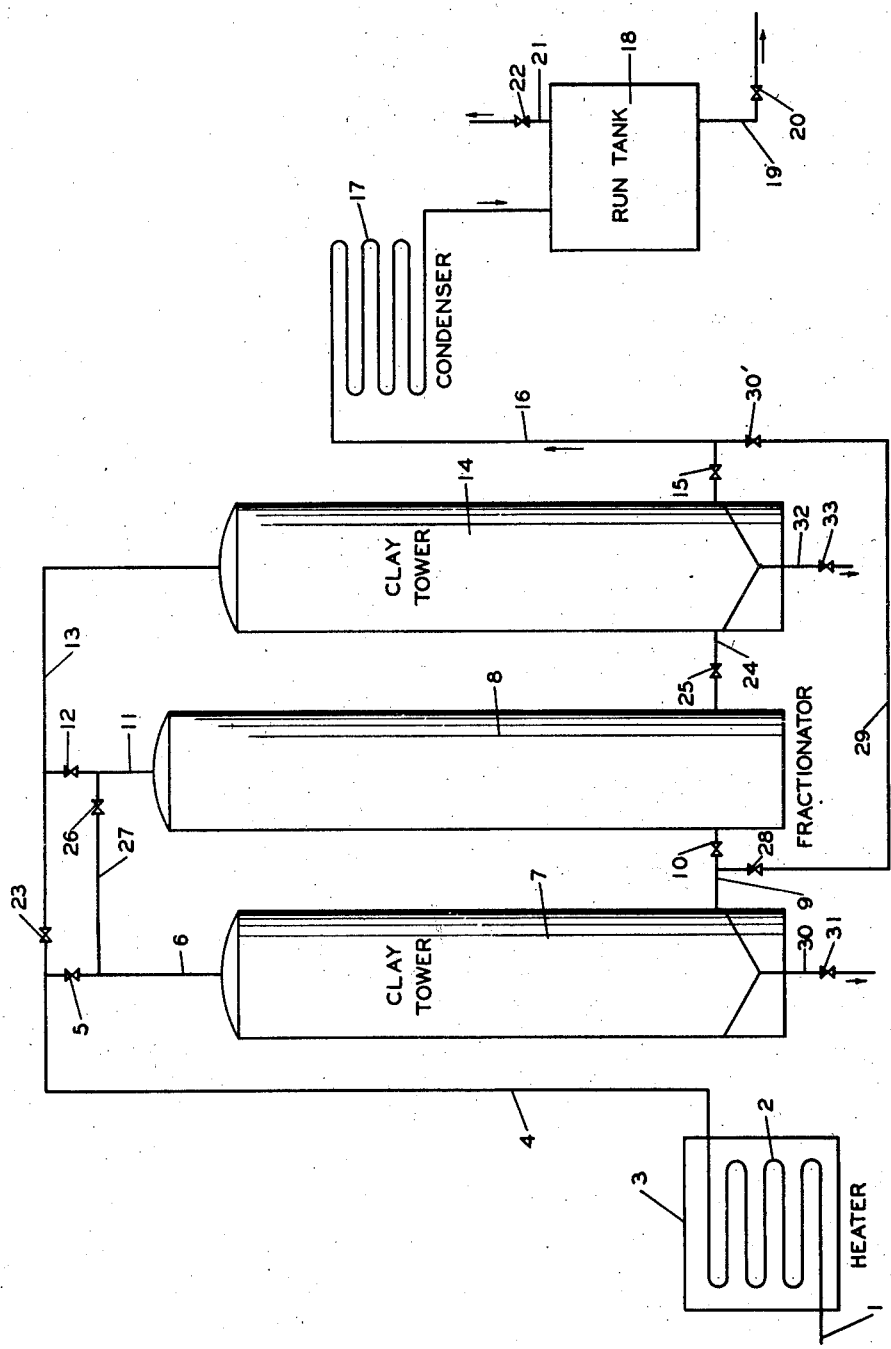
INVENTOR
HARRY E. DRENNAN
JAMES L. FARRELL (DECEASED)
BY MARJORIE B. FARRELL (EXECUTRIX)
BY
Hudson, Young, Shanley + Finger
ATTORNEYS Patented Jan. 12, 1943

UNITED STATES PATENT OFFICE

2,308,063
PROCESS FOR TREATING HYDROCARBON OILS

Harry E. Drennan, Bartlesville, Okla., and James L. Farrell, deceased, late of Borger, Tex., by Marjorie B. Farrell, executrix, Amarillo, Tex., assignors to Phillips Petroleum Company, Bartlesville, Okla., a corporation of Delaware Application October 12, 1939, Serial No. 299,224

2 Claims. (Cl. 196—52)

In the art of refining hydrocarbon oils, more particularly motor fuels, processes have been developed for improving the color and gum characteristics of these oils by passing them in the vapor phase, at temperatures below the cracking range, in contact with catalysts of the clay type such as fuller's earth, montmorillonite, bauxite, willonite, pyrophyllite, kaolinite, diatomaceous earth and the like. These materials are not of equal efficiency, and specific temperatures to be employed must be chosen by test and will vary in accordance, depending upon the particular hydrocarbon oil being heated and the particular catalyst employed. Temperatures commonly employed may be said to be roughly in the neighborhood of 400° F., although temperatures above and below this 400° have been found advantageous, depending upon the conditions above cited.

A process also has been described in which hydrocarbon oil vapors within the range of 600° F. to 1500° F. are placed in contact with catalysts of the clay-type to improve their antiknock characteristics, as described in the patent to Miller, No. 1,895,081, issued January 24, 1933.

Applicants have discovered that catalysts of the clay type which have been spent and are no longer satisfactory for treatment of hydrocarbons of relatively low temperatures for improving the color and gum characteristics are suitable in use as catalysts in the treatment of hydrocarbons at higher temperatures in improvement of their anti-knock characteristics.

In the treatment of hydrocarbon oils with catalysts of the clay type at relatively high temperatures for improving their anti-knock rating, there is usually a loss of color and it therefore becomes necessary to follow this treatment with one at low temperature to improve the color. The spent catalyst employed in the decolorizing step may then be employed as a catalyst for the improvement of anti-knock rating until it all becomes spent in that purpose. By employing the spent catalyst in this manner, a clay saving of 50% may be effected if the size and number of treating towers in both treating steps are so chosen that the catalysts employed in each of the steps will be spent for its specific use in that step after substantially the same length of time. It is understood, however, that the spent catalyst may be derived from decolorizing processes not operated in conjunction with the high temperature catalytic treatment for improvement in antiknock.

An object of this invention is to improve the color and gum characteristics of hydrocarbon oils.

A further object of the present invention is to improve the antiknock rating of motor fuels.

A still further object of the present invention is to provide a method for accomplishing the aforementioned objects, among others, at a lower operating cost.

Still further objects and advantages of the invention will be apparent from the following description of the method for suitably accomplishing applicants' improved results.

In refining hydrocarbon oils, more particularly motor fuels, it is old and well known to pass the hydrocarbon vapors at below cracking temperatures in contact with catalysts of the clay type, to improve the gum and color characteristics of such hydrocarbons. Temperatures employed in these known processes vary considerably, but those commonly employed are in the neighborhood of 400° F.

It is also known to pass hydrocarbon vapors in contact with catalysts of the clay type at elevated temperatures within the range of 600°–1500° F. for the purpose as described in the patent to Miller, No. 1,895,081, issued January 24, 1933.

Applicants have found that the catalytic material employed in the treatment to improve the color and gum forming characteristics of the oil being treated, after it is spent in that purpose, is entirely suitable for the treatment of hydrocarbon oils at elevated temperatures for improvement of their anti-knock characteristics.

In the treatment of hydrocarbons with catalysts of the clay type, such as fuller's earth at high temperatures for the improvement of octane number, there is a loss of color and we therefore propose to pass the treated vapors over catalysts of the clay type at lower temperatures to improve the color and gum characteristics. Applicants propose to provide towers for the improving step and for the decolorizing step of such number and size that the fresh clay in the decolorizing tower will become spent at approximately the same time the spent clay previously used in the decolorizing tower, now employed in the refining tower, becomes spent. By this arrangement, the quantity of fresh clay consumed is reduced one-half.

In the accompanying drawing there is illustrated diagrammatically one form of apparatus which may be employed in carrying out applicants' process. It is to be undertood, however, that the form of apparatus is for illustration only, and that various other arrangements are contemplated to carry out the claimed process.

The oil to be treated passes through the pipe 1 to the coil 2 in the furnace or heater 3 where it is vaporized and heated to the desired temperature for passage through the refining tower. The vapors are then passed from the coil 2 through the pipe 4 and valve 5 and pipe 6 to the tower 7 which contains the clay catalyst which has previously been spent in a decolorizing tower which may be the same tower. The vapors are then passed downwardly through the catalyst tower from whence they are introduced into the fractionator 8 by means of the pipe 9 and valve 10, where the vapors may be fractionated to the desired end point. The overhead from the fractionator 8 is passed through pipe 11, valve 12 and pipe 13 to the tower 14 which contains fresh catalyst of the clay type. The vapors in their passage through the tower at a temperature lower than in the refining tower are treated to improve their color and gum characteristics. From the tower 14 the vapors are passed through valve 15 and pipe 16 to condenser 17 and run tank 18. Product is withdrawn through pipe 19 and valve 20. Fixed gases are removed through pipe 21 and valve 22.

After the process has been in operation for a length of time to spend the catalyst in the towers 7 and 14, for their respective purposes of refining and decolorizing, the vapors from the furnace 3 at the high temperature are passed through valve 23 and pipe 13, valves 5 and 12 being closed, to tower 14 containing the spent decolorizing clay which is still suitable as a catalyst for refining. After passage through the tower 14 in contact with the catalyst, the vapors are passed through pipe 24 and valve 25 to the fractionator 8 whence they are fractionated to the desired end point. The overhead is taken from pipe 11 through valve 26 and pipe 27 to tower 7 which has been filled with new or regenerated catalytic material suitable for decolorizing. The vapors pass through tower 7 at a tower temperature suitable for decolorizing. From tower 7, the vapors are then passed through pipe 9, valves 28 and 29, valve 30', pipe 16, and condenser 17 to run tank 18. Pipes 30 and 32 controlled by valves 31 and 33 serve to drain the towers of any condensed hydrocarbons.

It will be apparent that by utilizing the spent decolorizing clay as a catalyst for refining or improvement of antiknock rating, at higher temperatures, a great economy in clay consumption can be effected.

While only two catalyst towers have been shown, it will be obvious to those skilled in the art that any suitable number or size may be employed.

We claim:

1. A process for treating liquid hydrocarbons to improve the antiknock quality thereof which comprises vaporizing the hydrocarbons, superheating the vapors to a temperature of 600 to 1500° F., passing said superheated hydrocarbon vapors through a bed of catalytic material of clay type for the improvement of octane number which material has been previously spent in the treatment of hydrocarbons for the purpose of improving their color and gum characteristics at temperatures below 600° F., passing said vapors at a temperature below 600° F. through a bed of active catalytic material of the clay type to improve the color and gum characteristics of the hydrocarbons, and so regulating the quantity of catalytic material in the respective stages that the catalytic material in each stage will be spent at approximately the same time for the specific improvement which it imparts to said hydrocarbon gases.

2. A process for treating liquid hydrocarbons to improve the antiknock quality thereof which comprises vaporizing the hydrocarbons, superheating the vapors to a temperature of 600–1500° F., consecutively passing said superheated hydrocarbon vapors through a bed of catalytic material of the clay type for the improvement of octane number which material has been previously spent in the treatment of hydrocarbons for the purpose of improving their color and gum characteristics at temperatures below 600° F., passing said vapors at a temperature below 600° F. through a bed of catalytic material of the clay type to improve the color and gum characteristics of the hydrocarbons, diverting the flow of hydrocarbon vapors initially to said last mentioned bed of active catalytic material when the same is substantially spent for the improvement of color and gum characteristics, and so regulating the quantity of catalytic material in the respective stages that the catalytic material in each stage will be spent at approximately the same time for the specific improvement which it imparts to said hydrocarbon gases.

MARJORIE FARRELL,
Executrix for the Estate of James L. Farrell, Deceased.

HARRY E. DRENNAN.